United States Patent [19]

Brinkmann et al.

[11]  4,415,268
[45]  Nov. 15, 1983

[54] TWIN SCREW EXTRUDERS

[75] Inventors: Heinz Brinkmann, Bennigsen; Siegfried Chszaniecki, Hanover, both of Fed. Rep. of Germany

[73] Assignee: Hermann Berstorff Maschinenbau GmbH, Hanover, Fed. Rep. of Germany

[21] Appl. No.: 272,348

[22] Filed: Jun. 10, 1981

[30] Foreign Application Priority Data

Jun. 23, 1980 [DE] Fed. Rep. of Germany ....... 3023393

[51] Int. Cl.³ ............................................... B29B 1/10
[52] U.S. Cl. ...................................... 366/85; 366/149
[58] Field of Search ...................... 366/84, 149, 83, 85, 366/24, 144, 145; 165/169, 47; 425/204, 378 R, 379 R; 264/176 R, 349

[56] References Cited

U.S. PATENT DOCUMENTS 3,268,949  8/1966  Schmidt ........................... 415/219 R
3,630,689  12/1971  Wheeler et al. ...................... 366/85
4,118,163  10/1978  Lee ................... 425/379 R
4,127,331  10/1978  Herbert et al. ......................... 366/83
4,176,969  10/1979  Wallace et al. ....................... 366/149

FOREIGN PATENT DOCUMENTS 2061700  7/1969  Fed. Rep. of Germany .
2037012  9/1969  France ................................. 366/83

Primary Examiner—Stephen Marcus
Assistant Examiner—Brian J. Bowman
Attorney, Agent, or Firm—Schwartz, Jeffery, Schwaab, Mack, Blumenthal & Koch

[57] ABSTRACT

A temperable screw casing for a twin screw extruder for processing plastics comprises a supporting member and wear resistant liner disposed therein. The liner has a spectacle shaped bore accommodating both screws of the extruder. The supporting member, which engages around the liner, takes over the reinforcing function of the screw casing. Low technical manufacturing cost and satisfactory tempering of the screw casing is achieved by providing the liner with a circular external cross section, surrounded by a supporting member which has a circular internal recess. Axial tempering holes are provided in wedge shaped projections which extend into the spectacle shaped bore of the liner. Axial tempering holes are disposed opposite one another in the supporting member, at the sides of the spectacle shaped bore of the liner. These result in individual tempering systems, by which the liner and supporting member can be tempered independently.

3 Claims, 2 Drawing Figures

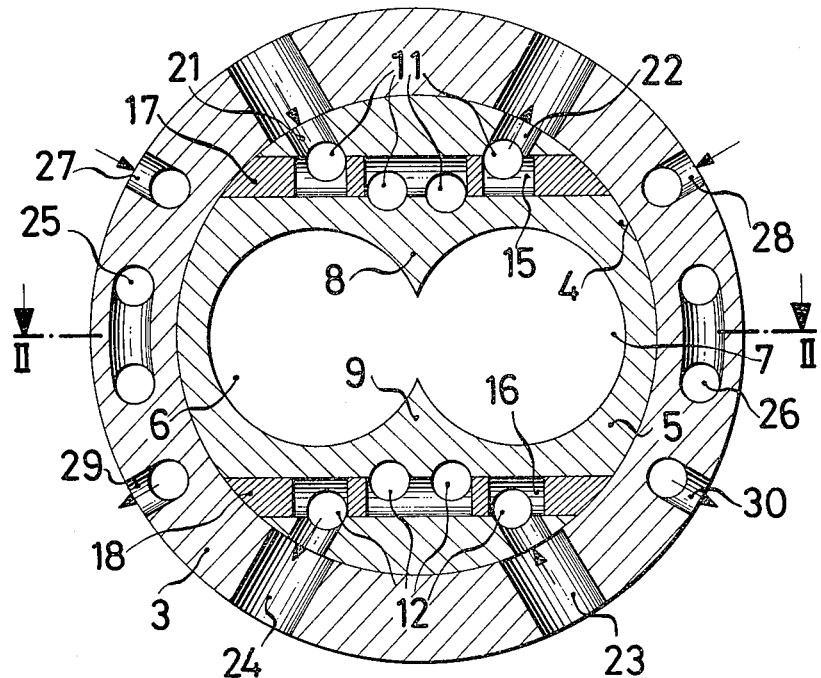

TWIN SCREW EXTRUDERS

This invention relates to twin screw extruders and more particularly to temperable casings for such twin screw extruders.

It is known to use twin screw extruders for processing plastics materials where the internal processing chambers are formed by wear resistant liners. The liners have internal layers which are wear resistant to lengthen the life of the extruding cylinder. To enable the liners to be replaced and to absorb the forces occuring in operation, the liners are surrounded by a supporting member.

When tempering casings of twin screw extruders of this type, that is to say controlling the temperature thereof, difficulty is experienced in obtaining a good even tempering action over the periphery of the spectacle shaped combined bore. The greatest quantity of heat per unit appears in wedge shaped projections between the two longitudinal bores of the liner, while lateral portions of the spectacle bore show less localisational heat.

In a known tempering means for twin screw extruders of this type, spiral external grooves are formed in the periphery of the liner. A spiral tempering passage is thus formed upon insertion of the liner into the supporting member. However, forming a good seal between the liner and the supporting member has been found to be a problem. Since the tempering medium has to be passed through the spiral tempering passages under pressure, and since a satisfactory sealing action cannot be obtained because of the need to be able to replace the liner, this known solution has rarely been used, German Published Application 20 61 700.

Another known screw casing with a wear resistant liner has two parallel longitudinal bores. These form a spectacle shaped bore in which the two extruding screws are located. The external cross section of the liner is bounded exclusively by convex or by convex and straight curves. The curves of the external cross section extend through the wedge shaped projections without bending inwards. The purpose of this is to obtain accurate surface contact in the supporting member and thus good heat transfer from the liner to the supporting member, while maintaining the possibility of easy replacement. The special shape of the external cross section of the liner requires a recess of the same cross section in the supporting member. Such a recess in the supporting member of the screw casing is technically expensive to provide and usually a two part supporting member is required.

The invention has among its objects to provide a casing for a twin screw extruder which can be manufactured with relatively low technical outlay and which nevertheless enables the casing to be satisfactorily tempered.

According to the invention there is provided a screw casing for a twin screw extruder for processing plastics, comprising a wear resistant liner having two parallel longitudinal bores therein with the bores overlapping and forming a combined spectacle shaped bore having two generally wedge shaped projections, projecting thereinto, said bore receiving twin extruder screws, and further comprising a supporting member which surrounds said liner and has a reinforcing function, wherein said liner has a circular external cross section, said supporting member is cylindrical and has a circular section bore in which said liner is received, axially extending tempering passages are formed in said generally wedge shaped projections of said liner and further axially extending tempering passages are provided in said supporting member at positions opposite one another, at the sides of said combined spectacle shaped bore.

The circular outside section of the liner makes the supporting member easier to manufacture. A recess of the same cross section, i.e. the circular recess in the supporting member, can be simply bored out with a drill or lathe. The supporting member need not be in two separate parts. The mechanical refinishing of the external circular surface of the liner, e.g. after the spectacle bore has been hardened, can be carried out in a simple way.

If the liner is made of two bi-metallic insert members, there is a requirement, after the production of the wear resistant inner layer, for separation of the individual parts of the liner and axis-parallel welding together. Refinishing of the resultant liner is necessary because of distortion which arises from the welding together process. This mechanical refinishing of the external surface of the liner can be carried out in a simple way by turning after the two liner members have been welded together.

The tempering systems in the liner and in the supporting member can make it possible for the screw casing to be tempered evenly, despite the different spacings between the contour of the spectacle bore and the outer surface of the liner. Heat flaws in the plastics to be processed are thereby avoided.

In an advantageous embodiment of the invention the liner and the supporting member can be tempered independently of one another. The two tempering systems of the liner may be associated with one temperature control cricuit, and the two systems of the supporting member with another.

By causing a tempering medium to flow through tempering passages of each system along a meandering path it is possible to link up a different number of tempering passages without having to change inlet and outlet holes.

The invention is diagrammatically illustrated by way of example in the accompanying drawing. Devices which are known per se and are not necessary to an understanding of the invention have been left out for the sake of clarity. In the drawing:

FIG. 1 shows a screw casing, comprising a supporting member and a wear resistant liner, in a cross section taken on line I—I in FIG. 2; and FIG. 2 is a plan view of the screw casing shown in FIG. 1, with the supporting member shown cut open and the liner partly broken open.

Referring to the drawing, a screw casing, which surrounds a twin screw (not shown) over part of its length, has a cylindrical supporting member 3, which has a circular section internal bore 4. A wear resistant liner 5 with a circular section external contour is disposed in the circular bore 4. The liner 5 has two parallel longitudinal bores 6 and 7 which overlap slightly to form a spectacle shaped bore with two wedge shaped projections 8 and 9. The liner 5 is secured in an axial direction by means of a shoulder 10 thereon of larger diameter, which lies in and in contact with an appropriate groove in the supporting member 3.

Four tempering passages 11 and four tempering passages 12 are bored into the wedge shaped projections 8 and 9 respectively, of the liner 5, the passages 11, 12 extending parallel to the bores 6, 7. At the end faces of the liner 5 the passages 11, 12 are sealed by plugs 13 and 14 respectively. The tempering passages 11, 12 are interconnected adjacent their ends by a respective transverse passage 15, 16. The passages 15, 16 are sealed by plugs 17 and 18 respectively. Between the tempering passages 11, 12 the transverse passages 15, 16 are alternately sealed by intermediate plugs 19, 20, so that a tempering medium admitted through an inlet passage 21 can be guided along a meandering path to an outlet passage 22. The radial inlet and outlet passages 21, 22 of each meandering bore system are connected to a pressure medium source (not shown) and a pressure medium return flow by radial passages 23, 24 formed in the supporting member 3.

The supporting member 3 surrounding the liner 5 has axially extending, peripheral tempering passages 25, 26 which are similarly connected by meanders, at the sides of the spectacle shaped bore 6, 7 of the liner 5. The two tempering systems can each be charged with the tempering medium through a radial inlet passage 27, 28 and radial outlet passage 29, 30.

The two tempering systems 11, and 12, located in the wedge shaped projections 8 and 9 of the liner 5, and the two tempering systems 25, 26, located at the sides of the spectacle shaped bore 6, 7, are disposed at approximately the same distance from the bore surface of the spectacle shaped bore 6, 7, as shown particularly in FIG. 1. It is therefore always possible for the spectacle bore 6, 7, which forms the working chamber, to be tempered evenly. The two meandering tempering systems of the liner 5 and the two tempering systems of the supporting member 3 may be controlled either together or separately. The most appropriate arrangement is for the two tempering systems of the liner 5 to be associated with one temperature control circuit and those of the supporting member 3 with another.

What is claimed is:

1. A screw casing for a twin screw extruder for processing and shearing plastics, comprising:

(a) a cylindrical supporting member having an internal bore circular in cross section,
   (b) a wear resistant liner positioned within and supported and reinforced by said supporting member, said liner having an external surface circular in cross section and fitting tightly within said bore of said supporting member, said liner being formed with two parallel longitudinal bores which overlap and form a combined spectacle shaped bore surface having two generally wedge shaped projections directed radially inwardly, said parallel bores being adapted to receive twin extruder screws for shearing and extruding plastic material,
   (c) axially extending tempering passages formed in said wedge shaped projections, each of said tempering passages being disposed at approximately the same distance from the bore surface of the spectacle shaped bore so as to provide even tempering of such material, and
   (d) additional axially extending tempering passages formed in said cylindrical supporting member at opposite sides thereof and laterally of the spectacle shaped bore, said additional tempering passage being independent of the first mentioned tempering passages and disposed at approximately the same distance from the bore surface of spectacle shaped bore so as to provide, together with said first mentioned tempering passages, even tempering of the material.

2. A screw casing as claimed in claim 1, further including separate tempering systems for the respective tempering passages of said liner and said supporting member, whereby said liner and said supporting member can be tempered independently of one another.

3. A screw casing as claimed in claim 1, wherein said first mentioned and said additional tempering passages are plugged at specified locations so that the tempering medium flowing through such passages traverses a meandering path for uniform tempering.

* * * * *